Aug. 14, 1962     R. F. OLIVER     3,049,093
FEEDER
Filed Oct. 25, 1961
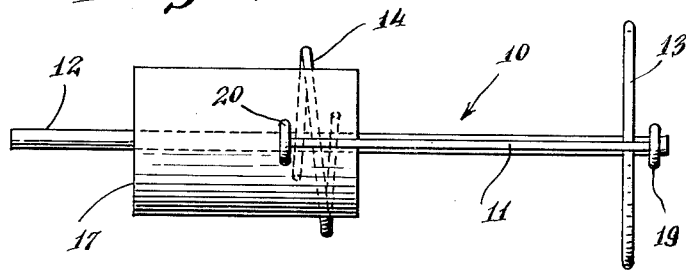
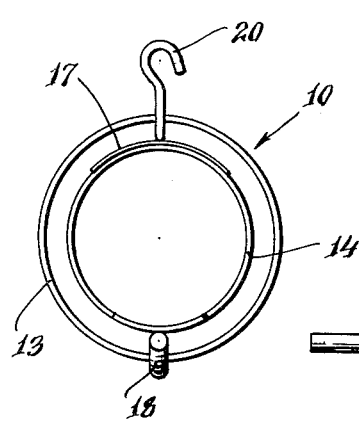
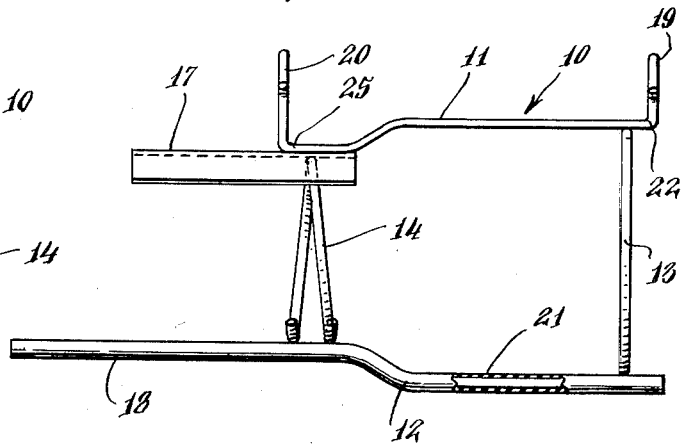
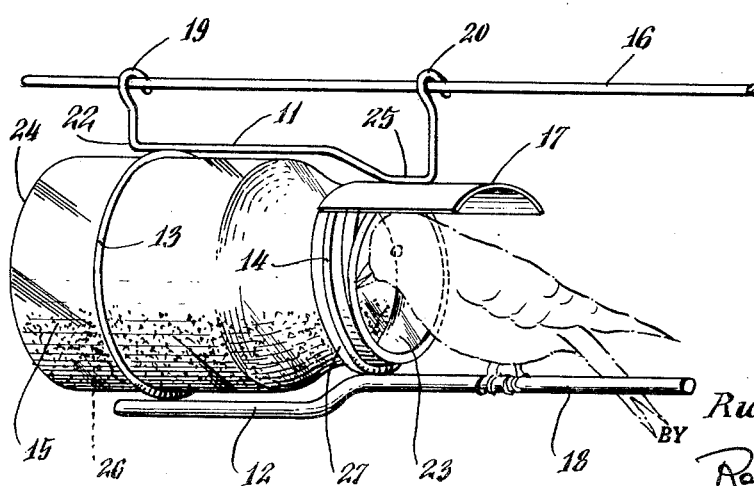
INVENTOR.
Ruth F. Oliver
BY
Ray L. Parzell
ATTORNEY.

3,049,093
FEEDER
Ruth F. Oliver, 83 Rogers Road, Hamden, Conn.
Filed Oct. 25, 1961, Ser. No. 147,694
6 Claims. (Cl. 119—51)

This invention relates to a feeder and more particularly to a wild bird feeder.

A desirable wild bird feeder is one in which the food is protected from the weather, raiding squirrels, and the like and renders the food clearly visible to the bird, particularly as it flies above the feeder.

One object of my feeder is therefore to provide a transparent food container.

Another object is to provide a simple skeleton frame to hold said container which will afford a maximum view to the bird of the food therein.

Still another object is to provide a means for easily removing the container from the supporting frame for purposes of cleaning and refilling.

Yet another object is to provide means on which the bird may alight and easily maintain its position while feeding.

Another object is to provide a feeder which can be suspended to an aerial line to protect the feeder from raiding squirrels and the like.

Other objects and a fuller understanding of the invention may be had by referring to the following description and claims, taken in conjunction with the accompanying drawings in which:

FIG. 1 is a top view looking down upon the frame with the container removed;

FIG. 2 is a longitudinal side view of the frame with the container removed;

FIG. 3 is an end view of the frame shown in FIG. 2;

FIG. 4 is a side view slightly in perspective showing the feeder attached to an aerial line.

In the following description and in the claims, various details will be identified by specific names for convenience, but they are intended to be as generic in their application as the art will permit.

In the drawings (where like reference characters denote like parts in the several figures) and in this description, certain specific disclosure of the invention is made for purposes of explanation, but it will be modified in various respects without departure from the broader aspects of the invention.

Referring now to the drawings, the frame of my feeder is generally denoted by the numeral 10 comprising skeleton members formed from wire, in my preferred form, which holds a transparent glass food container 15, having an open end 23. The frame 10 and the container 15 may be made of molded plastic or the like.

The longitudinal top member 11 of the frame 10 is connected to the longitudinal bottom member 12 by a rear transverse member 13 and a forward transverse member 14. In the preferred embodiment, I secure the connections by welding. The bottom member 12 is extended longitudinally in a forward direction to form a perch 18 on which the bird may alight.

In the preferred embodiment, I cover this member 18 with a pliant surface such as neoprene or rubber to afford a gripping means for the bird's feet.

The top member 11 is extended upward at each end thereof in order to form a forward supporting loop 20 and a rear supporting loop 19. The extension for the rear loop may be substantially longer than that of the forward loop 20, in my preferred embodiment, in order that the container 15 may tip downward at its rear, to better hold a large amount of food 26 without spilling.

The forward transverse member 14 in my preferred embodiment is substantially circular and is formed as a helix to correspond to screw threads 27 on container 15 subsequently described. The rear transverse member 13 is substantially circular in my preferred embodiment but may be polygonal depending on the cross section of the container 15 at that point as it assists in supporting the rear portion of container 15.

Attached to the forward end of the top member 11 adjacent the open end 23 of container 15 is a hood 17 to prevent snow and rain from getting into the container 15. This hood 17 may be of sheet metal or transparent plastic.

The container 15 is provided with a screw thread 27 at its open end 23. This screw thread 27 cooperates with the helical shape of transverse member 14 to enable the container 15 to be screwed into place after being charged with food and to be unscrewed when it is necessary to refill or clean the container 15. Except for the screw thread 27 at the open end of the container, the cross section of the container may be of any polygonal shape so long as it can be rotated to cooperate with the screw thread.

Although I have described my invention with a certain degree of particularity, it is understood that the present disclosure has been made only by way of example and that numerous changes in the details of construction and the combination and arrangements of parts may be resorted to without departing from the spirit and the scope of this invention as hereinafter claimed.

What is claimed is:

1. In an aerial line feeder, a transparent container having an open end; a surrounding frame supporting said container comprising; a longitudinal first member; a longitudinal second member; a plurality of peripheral transverse members uniting said first and second members in spaced relation; means for supporting said container to said frame; means for attaching said feeder to said line and a perch secured to said frame adjacent said open end.

2. In an aerial line feeder, a transparent container having an open end; a surrounding wire frame supporting said container comprising; a longitudinal top member; a longitudinal bottom member; a plurality of peripheral transverse members uniting said top and bottom members in spaced relation; means for supporting said container at the open end thereof to an adjacent transverse member; said top member having means for attaching to said aerial line; and said bottom member extending outboard longitudinally from said open end to form a perch.

3. In the device of claim 2, means for attaching said feeder to said line comprising the extension of said top member to form loop means to cooperate with said line.

4. In the device of claim 2 said perch having a non metallic pliant coating thereon.

5. In the device of claim 2 means for securing said container to said transverse member comprising said container terminating at its open end in a screw thread and said transverse member is helically formed to correspond with said screw thread whereby said container can be turned into holding engagement with said member.

6. In the device of claim 5, said top member extends longitudinally outboard of said opening and having a hood portion secured thereto to shelter said open end.

No references cited.